(12) United States Patent
Abu Al Rubb (10) Patent No.: US 9,127,749 B2
(45) Date of Patent: Sep. 8, 2015

(54) TRANSMISSION (71) Applicant: Khalil Abu Al Rubb, Doha (QA)

(72) Inventor: Khalil Abu Al Rubb, Doha (QA)

(*) Notice: Subject to any disclaimer, the term of this patent is extended or adjusted under 35 U.S.C. 154(b) by 0 days.

(21) Appl. No.: 14/351,853

(22) PCT Filed: Oct. 15, 2012

(86) PCT No.: PCT/GB2012/052551
§ 371 (c)(1),
(2) Date: Apr. 14, 2014

(87) PCT Pub. No.: WO2013/054141
PCT Pub. Date: Apr. 18, 2013

(65) Prior Publication Data
US 2015/0000463 A1 Jan. 1, 2015

(30) Foreign Application Priority Data

Oct. 14, 2011 (GB) .................................. 1117871.2

(51) Int. Cl.
F16H 3/50 (2006.01)
F16H 48/08 (2006.01)
F16H 3/08 (2006.01)
F16H 3/089 (2006.01)
F16H 47/06 (2006.01)

(52) U.S. Cl.
CPC .................. *F16H 3/08* (2013.01); *F16H 3/089* (2013.01); *F16H 47/06* (2013.01); *F16H 2200/0043* (2013.01); *Y10T 74/19149* (2015.01)

(58) Field of Classification Search
USPC .......................................... 74/348, 349, 730.1
See application file for complete search history.

(56) References Cited

U.S. PATENT DOCUMENTS

| 2,732,725 | A  |   | 1/1956  | Brueder |
| 3,889,547 | A  |   | 6/1975  | Sun et al. |
| 5,069,078 | A  | * | 12/1991 | Fairbanks .................... 74/216.3 |
| 6,852,057 | B2 | * | 2/2005  | Borbolla Gonzalez ....... 475/186 |
| 7,267,023 | B2 | * | 9/2007  | Wallasch ........................ 74/349 |

FOREIGN PATENT DOCUMENTS

| EP | 2339209 | 6/2011 |
| GB | 1466380 | 3/1977 |

OTHER PUBLICATIONS

International Application No. PCT/GB2012/052551, International Search Report and Written Opinion, mailed Jan. 30, 2013, 15 pages.
International Application No. PCT/GB2012/052551, Written Opinion of the International Preliminary Examining Authority, mailed Sep. 17, 2013, 6 pages.
International Application No. PCT/GB2012/052551, International Preliminary Report on Patentability, mailed Dec. 9, 2013, 7 pages.

* cited by examiner

*Primary Examiner* — Ha D Ho
(74) *Attorney, Agent, or Firm* — Kilpatrick Townsend & Stockton LLP (57) ABSTRACT A transmission comprising a plurality of concentric tori, each tori having means for engaging with an adjacent tori, the engaging means being actuated by the pressure of a pressurised fluid to thereby increase or decrease a gearing of gears attached to the transmission. A method of gearing is also provided.

18 Claims, 7 Drawing Sheets

TRANSMISSION

PRIOR RELATED APPLICATIONS

The present application is a National Phase application of International Application No. PCT/GB2012/052551 filed Oct. 15, 2012, which claims priority to Great Britain Application No. 1117871.2 filed Oct. 14, 2011, both of which are incorporated herein by reference in their entireties.

FIELD OF EMBODIMENTS OF THE INVENTION

Embodiments of the invention relate to a gear assembly and a method of gearing.

BACKGROUND

A number of transmissions are currently available on the market. One of these is a "double clutch transmission" where separate clutches operate separate sets of gears so that odd-numbered gears are actuated by one clutch and even-numbered gears are powered by another clutch.

It is also known to use hydraulic pressure to actuate a clutch. See, for example, GB 1466380 A.

SUMMARY

According to a first aspect, the invention provides a transmission comprising a driven shaft having one or more driven gears suitable for driving a driving shaft having a plurality of driving gears, wherein one or more of the driven gears are arranged to engage with one or more of the driving gears to thereby alter a speed or torque of the driving shaft relative to a speed or torque of the driven shaft, wherein the driven shaft is brought into engagement with one or more of the driven gears through the action of a pressurised fluid, and wherein the pressure of the pressurised fluid determines which of the one or more driven gears is engaged with the driven shaft. Each driven gear comprises a corresponding annulus, the plurality of annuli being arranged concentrically. Adjacent annuli are brought into engagement with one another through an increase in the pressure of the pressurised fluid and are brought out of engagement with one another through a reduction in the pressure of the pressurised fluid.

Each of the annuli arranged within another annulus may comprise circumferential engaging means, the circumferential engaging means being adapted to engage with an outer annulus when the pressure of the pressurised fluid exceeds a corresponding predefined amount.

The circumferential engaging means may act to allow egress of the pressurised fluid between adjacent annuli.

The transmission may comprise a sequence of adjacent annuli, each inner annulus having a corresponding set of circumferential engaging means for engaging with a respective adjacent outer annulus.

A pressure of the pressurised fluid may be varied through the action of a propeller acting on the pressurised fluid.

The pressure of the pressurised fluid may be altered by altering a speed of the propeller and/or an angle of attack of one or more blades of the propeller.

The transmission may further comprise a swash plate to alter an angle of attack of one or more blades of the propeller.

The propeller may be housed in a Venturi cone and the Venturi cone may act to funnel the pressurised fluid through a shaft.

The transmission may also comprise a receiving impeller 17 housed in the Venturi Cone, the receiving impeller funnels the fluid into a hollow shaft which is connected to the centrifugal gear arrangement. Funnelling the Fluid can be made within the shaft using a Hollow Shaft, or can be done using the gap between the Shaft 22 and Shaft Case 37.

The shaft may be connectable to the plurality of driving gears.

In a further embodiment the transmission comprises more than one shaft, each shaft having associated therewith a set driven gears, each set of driven gears being associated with a corresponding set of driving gears. For example, such an arrangement may be used with the Double Clutch or direct shift gearbox.

According to a further aspect, the invention provides a method of gearing in a transmission, the transmission comprising a driven shaft having one or more driven gears suitable for driving a driving shaft having a plurality of driving gears, wherein one or more of the driven gears are arranged to engage with one or more of the driving gears to thereby alter a speed or torque of the driving shaft relative to a speed or torque of the driven shaft, the method comprising the steps of:

bringing the driven shaft into engagement with one or more of the driven gears through the action of a pressurised fluid, wherein the pressure of the pressurised fluid determines which of the one or more gears is engaged with the driven shaft, and wherein each driven gear may comprise a corresponding annulus, the plurality of annuli being arranged concentrically; and bringing adjacent annuli into engagement with one another through an increase in the pressure of the pressurised fluid and bringing the adjacent annuli out of engagement with one another through a reduction in the pressure of the pressurised fluid.

Each of the annuli arranged within another annulus may comprise circumferential engaging means and the method may further comprise the step of engaging the circumferential engaging means with an outer annulus through the action of an increase in the pressure of the pressurised fluid by a predetermined amount.

The method may further comprise the step of allowing an egress of the pressurised fluid between adjacent annuli.

The transmission may comprise a sequence of adjacent annuli, each inner annulus having a corresponding set of circumferential engaging means for engaging with the respective adjacent outer annulus.

The method may further comprise the step of varying the pressure of the pressurised fluid through the action of a propeller acting on the pressurised fluid.

The method may further comprise the step of altering the pressure of the pressurised fluid by altering a speed of the propeller and/or an angle of attack of one or more blades of the propeller.

The transmission may further comprise a swash plate, the method may then further comprise the step of altering an angle of one or more blades of the propeller through an action of the swash plate.

The propeller may be housed in a Venturi cone, in which case the method may further comprise the step of funnelling the pressurised fluid through the Venturi cone to a shaft.

The shaft may be connectable to the plurality of driving gears.

BRIEF DESCRIPTION OF THE DRAWINGS

Example embodiments of the invention are hereinafter described with reference to the accompanying diagrams which are not to scale and where.

DESCRIPTION OF EXAMPLE EMBODIMENTS

The Figures are schematic in nature and not drawn to scale, and are intended for illustrative purposes only.

Figure 1:
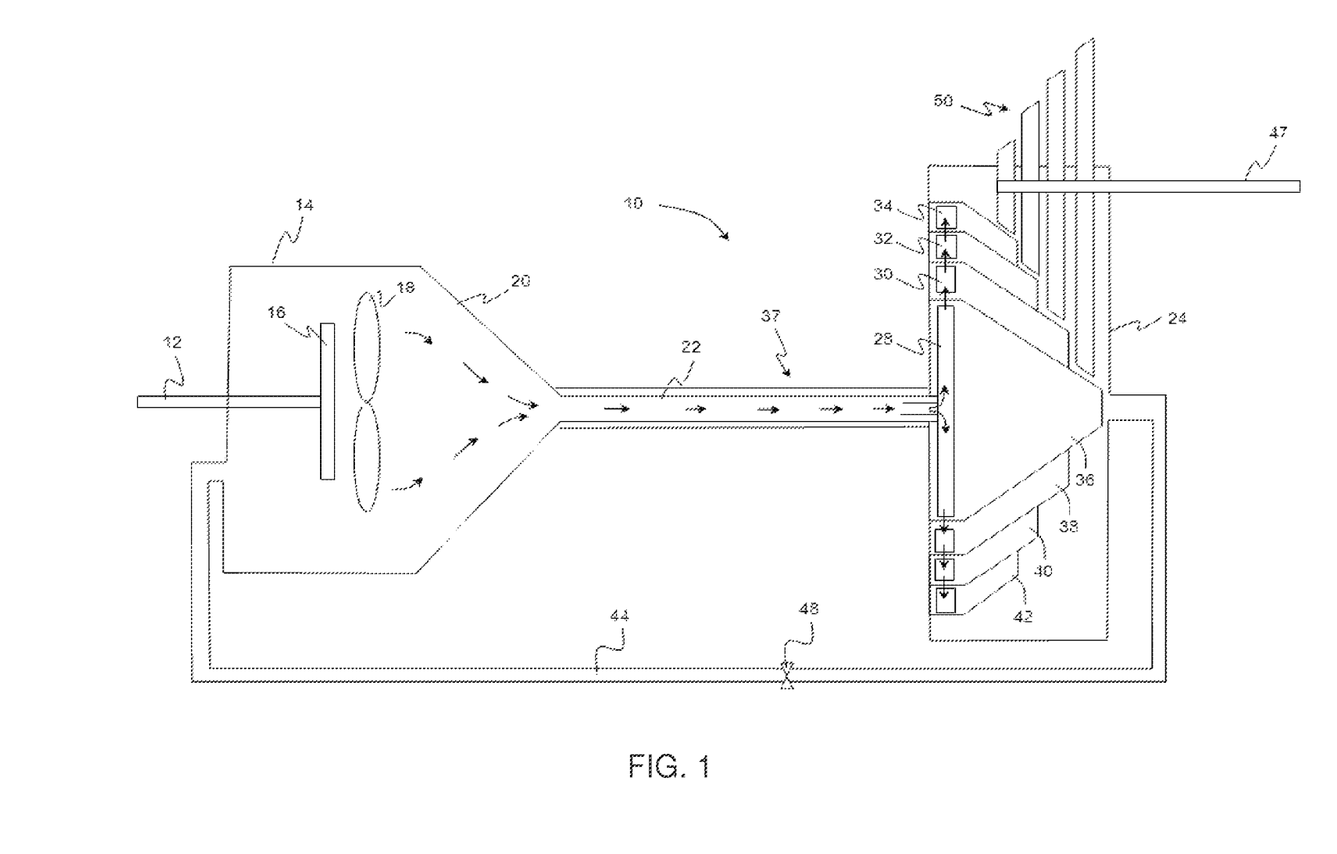
FIG. 1 is a schematic diagram of a transmission according to a first embodiment of the invention.

FIG. 1 illustrates a transmission 10 according to a first embodiment of the invention. The transmission 10 comprises a control shaft 12 connected to a swash plate 16. The swash plate 16 is encased in a hydraulic housing 14 and is immersed in a hydraulic liquid enclosed within the housing 14. Although not shown in FIG. 1, the control shaft 12 may be connected to, and operated by, user-operated controls of a vehicle.

The swash plate 16, in turn, controls the blade angle of a propeller 18. The housing 14 is connected to a Venturi cone 20 which has a fluid receiving impeller 17 and is connected to a shaft 22 terminating in a disc housing 24. Arranged within the housing 24 is a clutch assembly 26 which comprises a central disc 28 and three annular discs 30, 32 and 34 is illustrated in greater detail in FIG. 2 and described below. This shaft 22 can be solid in which case the fluid is transferred from the Venturi 20 into Disc 28 via the space between the shaft and the shaft case 37 and into disc 28 via a suction eye between the disc 28 and shaft 22 shown in FIG. 1 by the dotted line. Alternatively, the central disc 28 is connected to hollow shaft 22 so that hydraulic fluid carried by hollow shaft 22 enters disc 28. Furthermore, the hydraulic fluid may, selectively enter discs 30, 32 and 34 in the manner described below. Although not illustrated in this Figure, the other side of the driven shaft is connected to a driving source such as an internal combustion engine in a known manner. As the driving source rotates, this causes the driven shaft 22 to rotate which, in turn, causes the central disc 2.8 to rotate.

Each of the discs 28, 30, 32 and 34 are connected to corresponding driven gears 36, 38, 40 and 42 so that rotation of a disc causes rotation of the corresponding gear.

Each of the driven gears 36, 38, 40 and 42 engage with a driving gear 50, which is, in turn, connected to a driving shaft 47. The driving shaft 47 is connected in a known manner to wheels, or other propulsion means.

The swash plate 16 operates to alter the pitch of the propeller 18 in a known manner. The housing 14, Venturi cone 20, impeller 17, hollow shaft 22 and housing 24 are all in fluid communication with one another. Therefore, the action of the propeller 18 affects the flow and pressure of the hydraulic fluid within these components. More specifically, as the pitch of the propeller is varied through the action of the swash plate 16, the pressure of the hydraulic fluid contained within the housing 14, Venturi cone 20, impeller 17, hollow shaft 22 and central disc 28 varies. In order to accommodate an increase and decrease in pressure, the components are connected to a reservoir for the hydraulic fluid (not shown).

Figure 2:
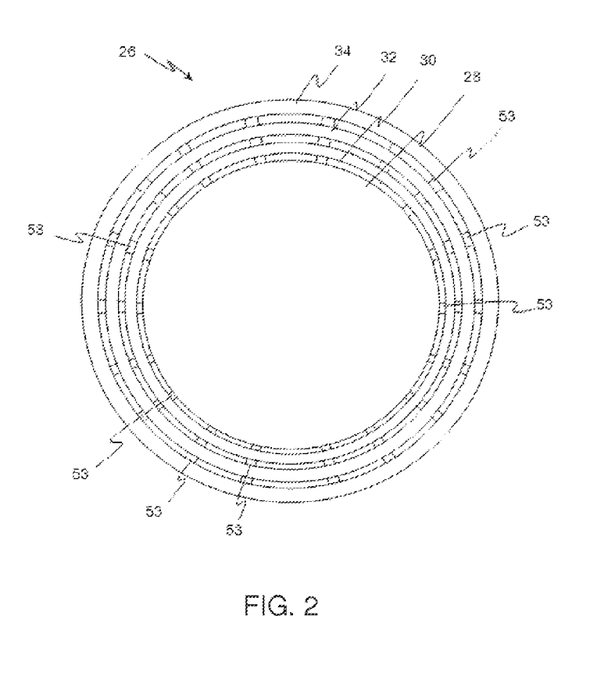
FIG. 2 is a schematic diagram of a portion of the transmission of FIG. 1.

It is to be realised that the hydraulic fluid interacting with the swash plate 16, propeller 18, Venturi cone 20, impeller 17, hollow shaft 22, and housing 24 forms part of an enclosed hydraulic system to which discs 28, 30, 32 and 34 may be added in the manner described, FIG. 2 illustrates the clutch assembly comprising a disc assembly 26 in greater detail. Disc assembly 26 comprises the central driving disc 28 which is mounted to rotate due to action of the driven shaft 22 (see FIG. 1). Arranged concentrically about the driving disc 28 are three discs 30, 32 and 34. Each of the discs 30, 32 and 34 are arranged to rotate independently of one another and of the driving disc 28, or selectively together with driving disc 28 as described below in greater detail. In the configuration illustrated in FIG. 2, each of the 28, 30 and 32 discs is connected to the next adjacent disc by ball bearings 53.

Figure 3:
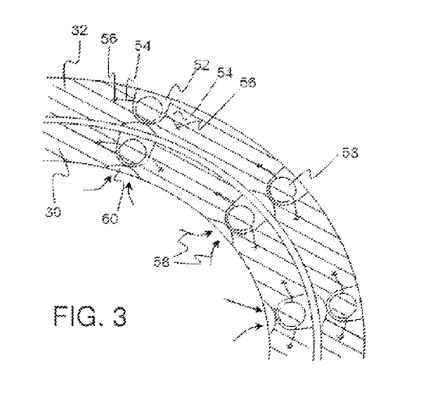
FIG. 3 is a schematic diagram of the portions of two clutch discs of the transmission of FIG. 1.
Figure 4:
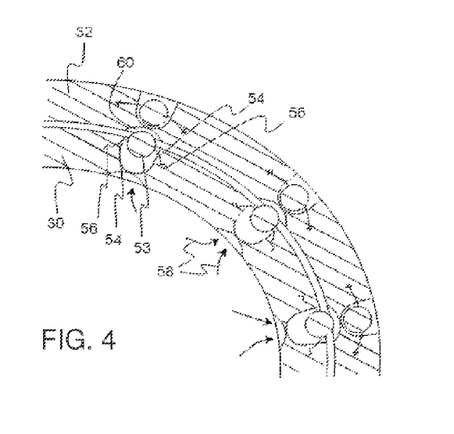
FIG. 4 is a schematic diagram of the portions of the clutch discs of FIG. 3 with respective ball bearings extended.

Referring now to FIG. 3, this illustrates a portion of the annular discs 30 and 32 and the location of three of the ball bearings 53 within respective wells 52 in each disc. As illustrated in FIG. 4, the ball bearings 53 are able to move radially inwards and outwards relative to the disc 30 within the well 52. Each ball bearing 53 is connected to the corresponding disc by two leaf springs 54 having looped ends connected to respective coil springs 56. The leaf and coil spring arrangement allows the ball bearings 53 to move within the wells 52 whilst ensuring that the bias of the springs encourages the ball bearings back into the position shown in FIG. 3. The pressure of the hydraulic fluid acts against the ball bearings 53 in the direction of arrows 58. It is the increase in this pressure which encourages the ball bearings to move in a radially outward direction whereas their movement in a radially inward direction occurs due to the action of the respective springs.

The inner surface of each of the outer discs illustrated in FIG. 2 (discs 30, 32 and 34) are arranged to receive the ball bearings 53 from the next radially inner disc so that movement can be translated from the inner disc to the outer disc. Each of the outer discs 30, 32 and 34 are therefore formed with a plurality of receptacles 60 at a position corresponding to the position of the ball bearings 53 of the disc which the receptacles face.

Outermost disc 34 is has receptacles 60 for receiving the ball bearings of disc 32. In a similar manner, innermost disc 28 has ball bearings 53 but has no inner surface as it is directly connected to the hydraulic fluid.

FIG. 4 illustrates the configuration of discs 30 and 32 when the bail bearings of disc 30 are engaging with the receptacles of disc 32 under the influence of hydraulic fluid.

The action of the hydraulic fluid (illustrated by arrows 58 in FIGS. 3 and 4) causes the ball bearings 53 of disc 30 to move from their rest position (illustrated in FIG. 3) to an engaging position (illustrated in FIG. 4). As illustrated in FIG. 4, when the ball bearings 53 of disc 30 are in the engaging position, they are received by the corresponding receptacles 60 of the next disc. As illustrated in FIG. 4, the ball bearings 53 of disc 30 are being received by the receptacle 60 of disc 32. Each ball bearing 53 which is in the correct position will engage with a corresponding receptacle 60. This, in turn, causes the disc 32 to rotate along with disc 30. Each of the discs 30 and 32 (as well as the discs 28 and 34 illustrated in FIG. 2) are connected to corresponding gears. In this manner the disc arrangement 26 illustrated in FIG. 2 acts as a clutch to engage the selected gear.

Figure 13:
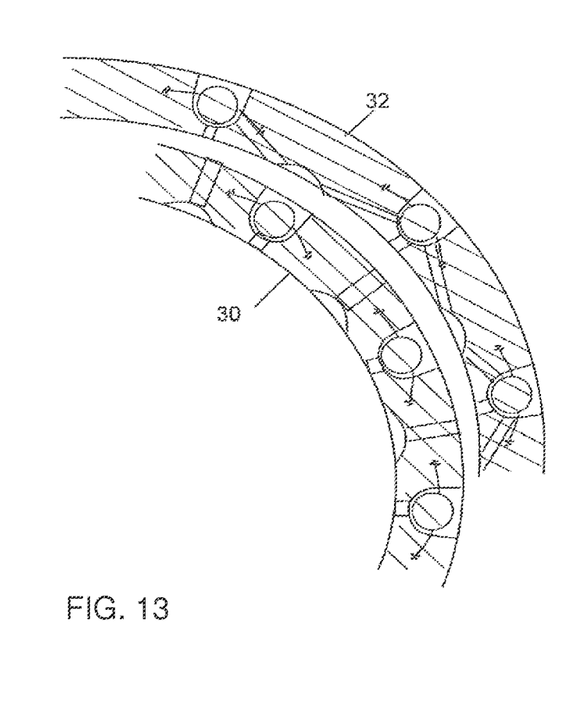
FIG. 13 is an alternative embodiment to FIGS. 3 and 4.

As an alternative to the arrangement shown in FIGS. 3 and 4, the respective discs may instead be respectively circumferentially offset with respect to each other, with the receptacles 60 positioned roughly half way between each ball bearing, rather than being circumferentially co-located, FIG. 13 illustrates such an arrangement. The ball bearings of the next radially inner ring i.e. ring 30 in the case of ring 32 are located adjacent to the receptacles, as in the embodiment of FIGS. 3 and 4. Oil channels are provided in each ring between the receptacles 60 thereof and the ball bearings of the ring to allow the hydraulic fluid to flow from one set of ball bearings in an inner ring to the next set of ball bearings in the next ring outwards.

Apart from the circumferential offset, the operation of the arrangement of FIG. 13 is the same as in FIGS. 3 and 4, as described in the following.

With reference to FIG. 1, the pressure of the hydraulic fluid is controlled by a user by controlling the pitch of swash plate 16, and the speed of propeller 18 which acts on impeller 17 and turning the shaft 22. An increase in the rotational speed of impeller 17 and shaft 22 increases the pressure and centrifugal force acting on the ball bearings 53 causing concentrically orientated discs to engage with one another. Since innermost disc 28 is driven (as described), the engagement of this disc with adjoining disc 30 will impart circular motion to the disc 30 and, as the pressure increases, to discs 32 and 34. Since each of the discs 28, 30, 32 and 34 is connected to a corresponding driven gear 36, 38, 40 and 42, the rotation of the discs will cause the rotation of the corresponding driven gear.

As illustrated in FIG. 1 and described above, each of the driven gears 36, 38, 40 and 42 is connected to a driving gear 50. Therefore, the increase in the pressurised fluid can selectively change the gearing of the transmission 10.

In a similar manner, the pressure of the hydraulic fluid may be reduced by operation of the swash plate 16 and the propeller 18. As the hydraulic fluid ceases to act against the ball bearings 53, the leaf springs 54 and coil springs 56 will encourage the ball bearings back into their respective wells 52 thereby bringing the ball bearing out of engagement with the adjacent disc (back to the configuration shown in FIG. 3, for example). This too causes the 210 corresponding gear to cease being driven, thereby changing the gearing of the transmission 10.

In this manner, the transmission 10 may be used to alter the gearing by controlling the pressure of an hydraulic fluid.

Figure 5:
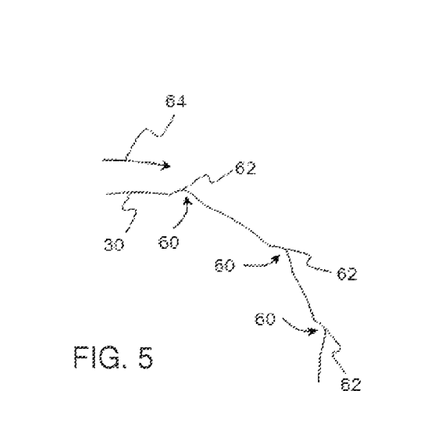
FIGS. 5 and 6 are schematic diagrams of profiles of an inner engaging surface of a clutch disc according to two further embodiments in profile.

FIG. 5 is a schematic diagram of a profile of a portion of the inner surface of disc 30 illustrating the receptacles 60. As illustrated each of the receptacles 60 is formed with a trailing lip 62 which is formed to engage the ball bearings 53. The disc 30 rotates in the direction of arrow 64 so that the lips 62 form a seating to engage with the ball bearing 53 so that rotational motion may be translated from the radially inner disc 30 to disc 32 (FIGS. 3 and 4).

Figure 6:
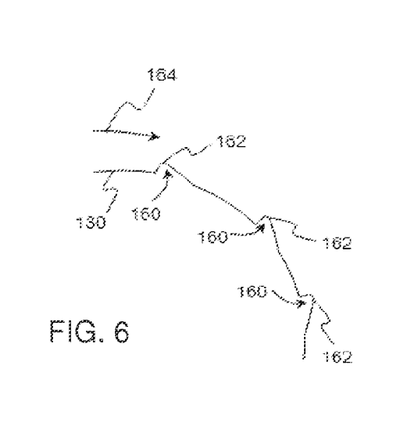

FIG. 6 is a schematic illustration of a portion of a disc 130 according to an alternate embodiment. Disc 130 rotates in the direction of arrow 164 and has receptacles 160, each formed with lip 162. A comparison between the arrangement of FIG. 6 and that of FIG. 5 shows that the lip 162 is more pronounced than the lip 62 of FIG. 5. The advantage of the embodiment illustrated in FIG. 6 is that the receptacles 160 engage more easily and firmly with the corresponding ball bearings, but has a disadvantage that the receptacle 160 will wear more quickly.

Figure 7:
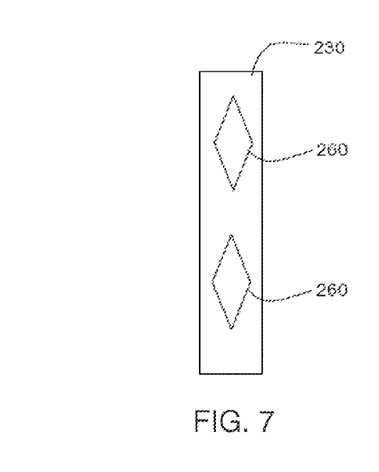
FIG. 7 is a schematic diagram of an inner surface of a portion of a clutch disc according to a further embodiment.

FIG. 7 illustrates a portion of a disc 230 according to yet a further embodiment of the invention. As illustrated in FIG. 7, the disc 230 has receptacles 260. The receptacles 260 operate in the manner described above with reference to FIGS. 4, 5 and 6 in that they provide a point of attachment between radially adjacent discs. As illustrated in FIG. 7, the receptacles 260 have a diamond shape. This diamond shape encourages engagement between radially adjacent discs and thereby facilitates the translation of radial motion between these discs.

Although certain profiles and shapes for the receptacles have been illustrated in FIGS. 4, 5, 6 and 7, many other shapes are possible for the receptacles. The size and extent of the receptacle will depend on the speed and torque experienced by the respective discs and the strength and durability, as well as the speed of engagement and disengagement, between radially adjacent discs.

Figure 8:
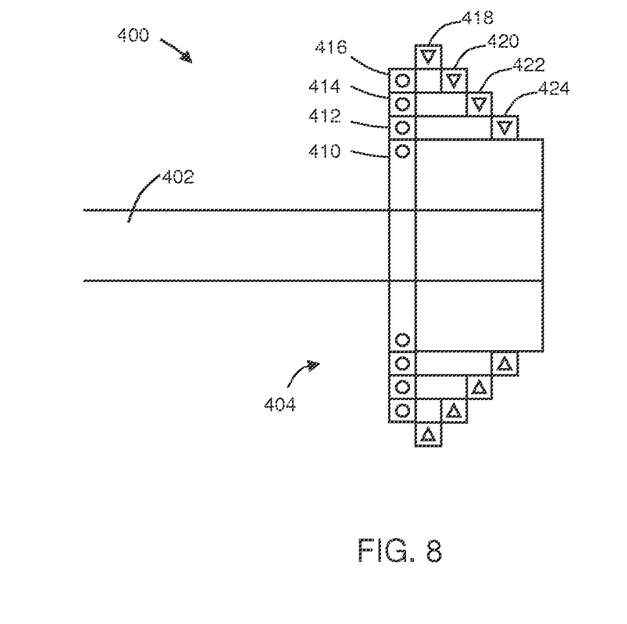
FIG. 8 is a schematic diagram of an arrangement of driven gears on a driven shaft.

FIG. 8 illustrates an arrangement 400 of driven gears on a driven shaft 402. The arrangement 400 comprises a plurality of sequentially engageable discs 410, 412, 414 and 416 arranged and operable in the manner described above with reference to FIGS. 1 to 7. Each of the discs has a corresponding driven gear. Driven gear 418 therefore corresponds to disc 416. Similarly, driven gears 420, 422 and 424 correspond to discs 414, 412 and 410. As illustrated in FIG. 8, the driven gears are mounted on an outside surface of a shaft connected to the respective disc. Therefore, each driven gear stands proud of an outer surface of the shaft associated with the corresponding disc.

Figure 9:
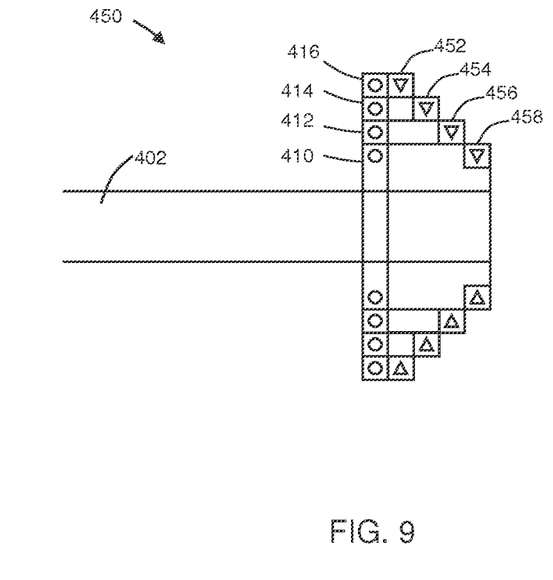
FIG. 9 is a schematic diagram of an alternative arrangement of driven gears on a driven shaft.

FIG. 9 illustrates an alternative arrangement 450 of a plurality of driven gears mounted with respect to a driven shaft 402. For the sake of convenience, the same numerals are used to denote similar features as illustrated in FIG. 8. The arrangement 450 comprises discs 410, 412, 414 and 416 which operate in a manner as described above with reference to FIGS. 1 to 7.

Associated with each disc is a corresponding driven gear. Driven gears 452, 454, 456 and 458 correspond to discs 416, 414, 412 and 410. As illustrated in FIG. 9, the driven gears have an outer surface corresponding to the outer surface of their respective discs. In this arrangement, the driven gears are recessed into an outer surface of a shaft associated with the corresponding disc.

Figure 10:
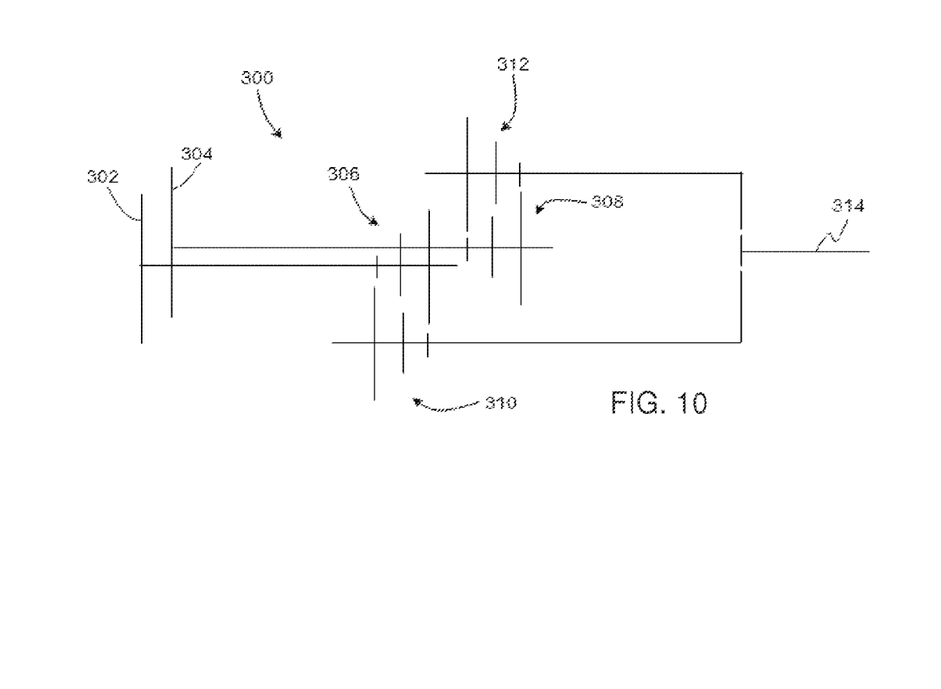
FIG. 10 is a schematic diagram of a transmission according to a further embodiment of the invention.

FIG. 10 is a schematic diagram of a transmission 300 according to a further embodiment of the invention. The transmission 300 includes two clutch controllers 302 and 304 connected to respective driven gear sets 306 and 308. Although not illustrated in FIG. 10, driven gear sets 306 and 308 are connected to a source of power, such as an internal combustion engine, by means of a shaft.

Driven gear set 306 is connected to a driving gear set 310 and driven gear set 308 is connected to a further driving gear set 312. Both of driving gears sets 310 and 312 are connected to a main driving shaft 314.

The transmission 300 differs from the transmission 10 illustrated in FIG. 1 in that it includes two clutch controls 302 and 304 connected to corresponding gear sets 306 and 308. The operation of transmission 300 is similar to that of transmission 10 but differs in that there is a double clutch system, the first comprising clutch control 302, driven gear set 306 and driving gear set 310; the second comprising clutch control 304, driven gear set 308 and driving gear set 312. It is to be realised therefore that embodiments of the invention are applicable to double clutch systems. It will be further realised that embodiments are not limited in this respect and additional clutches can be implemented as required. Furthermore, clutches according to an embodiment of the invention may be utilised with known clutches, where appropriate.

Figure 11:
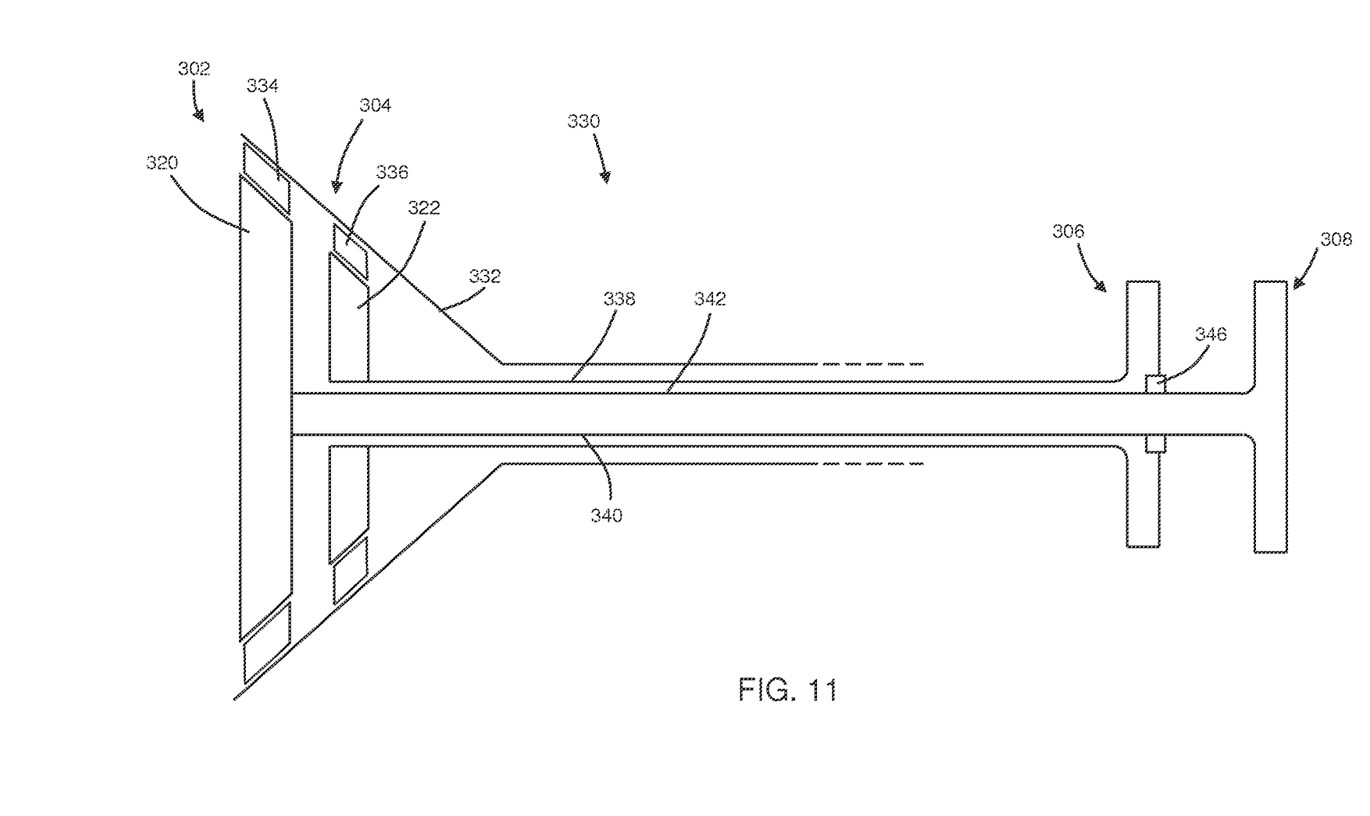
FIG. 11 is a schematic diagram of a portion of the conservation according to FIG. 10.

FIG. 11 illustrates a portion 330 of the transmission 300 illustrated in FIG. 10. As illustrated in FIG. 11, the clutch control 302 comprises an impeller 320 connected to a shaft 340. Similarly, clutch control 304 comprises impeller 322 connected to shaft 338. Provided between shafts 338 and 340 is a gap 342. The gap 342 allows the flow of oil between shaft 338 and shaft 340.

Shaft 340 connects impeller 320 to disc arrangement 308. Similarly, shaft 338 connects impeller 322 to disc arrangement 306. A mechanical seal 346 separates disc arrangement 306 from shaft 340.

Impeller 320 controls the engagement of disc arrangement 308 in the manner described above with reference to FIGS. 1 to 9. Similarly, impeller 322 controls the engagement of disc arrangement 306 in a similar way.

Clutch control 302 further comprises a valve 334 which regulates the flow of hydraulic fluid between impeller 320 and the remainder of transmission $330_{[41]}$. Similarly, clutch control 304 includes a valve 336 for regulating the control of hydraulic fluid.

In an alternative embodiment, valves 334 and 336 are replaced with brakes which act to stop the rotation of the respective impeller, thereby allowing the hydraulic fluid to influence the required impeller.

Although the gear assembly 26 of the attached Figures has been illustrated with three gear discs it is to be realised that more or fewer gear discs may be provided, as required.

The applicant's co-pending British application no. 1004680 discloses a horizontally orientated pedal for use with an automobile or other powered vehicle. It is to be realised that the pedal disclosed in that application may be used in conjunction with embodiments of the current invention so that the application of pressure to one side of the pedal causes an increase in the hydraulic pressure by causing the propeller to spin faster whereas a pressure on the other side of the pedal causes a decrease in the hydraulic fluid by:
  a) Slowing the propeller down.
  b) Closing or controlling Valve 48 of FIG. 1 to create extra pressure in compartment 24 of FIG. 1, that in turn will cause the Ball Bearing 53 of FIG. 3 to retract down hence slowing the vehicle by engaging a lower gear and hence lower gear ratio.
  c) Reversing the angle of attack of Propeller 18 which in turn creates a back suction effect causing all the engaged ball bearings 53 to fall back in their wells 52, disengaging from the driven gear to a very low Or Lowest Gear within an extremely short time frame. That particular braking mechanism can only be used in emergency braking situations that will be determined by a sensor on the Brake Pedal.

In general, it is to be realised that the pressure of the hydraulic fluid in embodiments of the invention may be controlled by either the speed or the pitch of the propeller. Therefore, the optimum speed and pitch of the propeller may be calculated by a computing device to maintain the pressure of the hydraulic fluid in the most fuel-efficient manner. This will include determining the optimum pitch and optimum speed of the propeller for a given pressure or a required speed.

Figure 12:
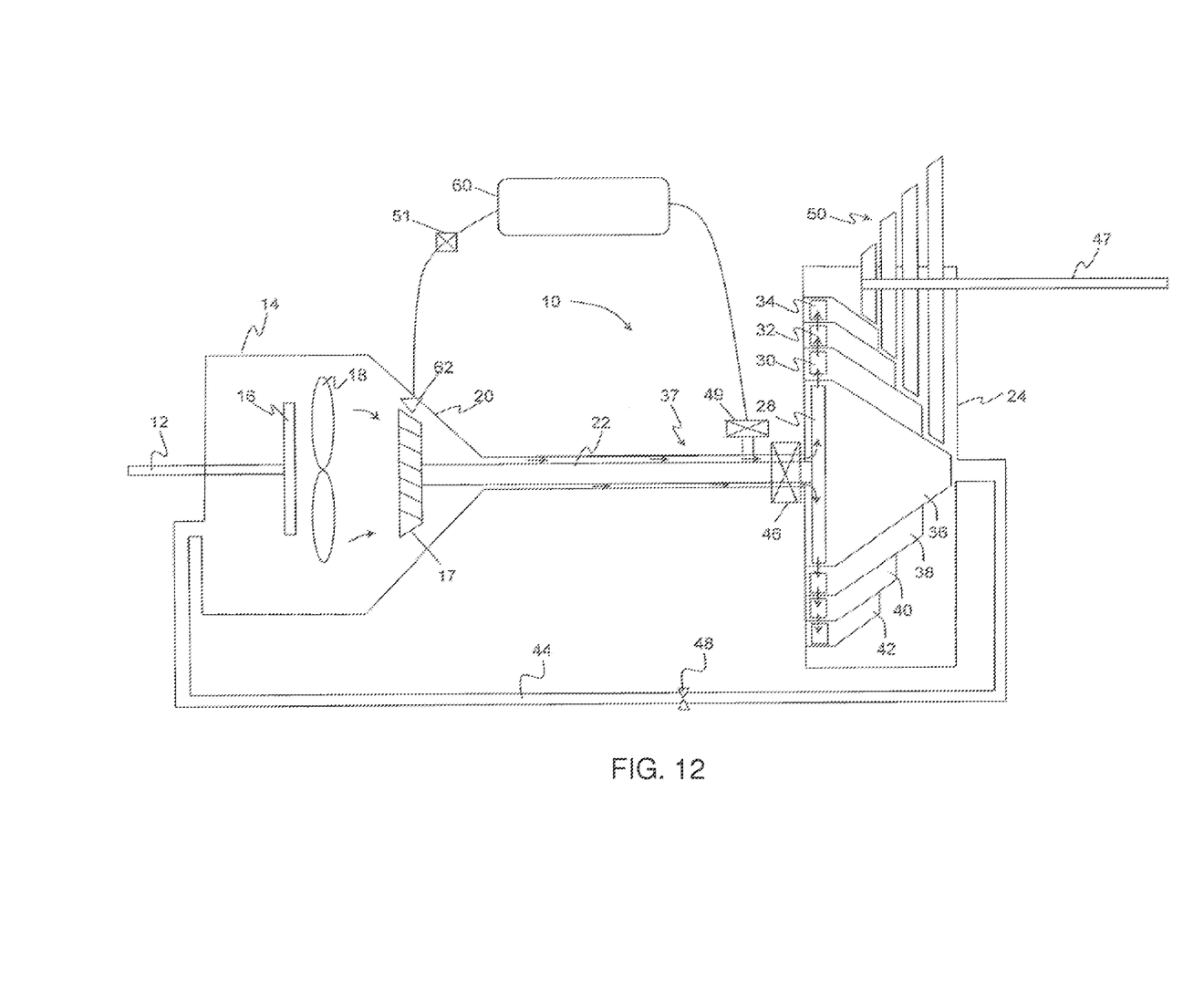
FIG. 12 is an alternative embodiment to FIG. 1.

FIG. 12 illustrates a further embodiment of the invention. The general configuration and operation of the embodiment of FIG. 12 is the same as that described above for FIG. 1, and hence the structure and operation thereof that is identical will not be repeated. However, the embodiment of FIG. 12 adds in additional components, in the form of hydraulic accumulator 60, valves 46, 49 and 51, and jet nozzle 62.

More specifically, the further embodiment is provided with a Variable Jet Nozzle 62 arranged to release pressurised hydraulic fluid in the direction of impeller 17, in order to cause impeller 17 to spin. In this respect, jet nozzle 62 and impeller 17 act as a turbine, to rotate shaft 22. The valve 46 is located at the beginning of gearbox 24 end of shaft 22, and acts to shut oil flow from entering the box. Valve 49, on the other hand, opens reciprocally with the closing of valve 46, to allow the hydraulic fluid to flow into hydraulic accumulator 60. Valve 51 is located on the output line from hydraulic accumulator 60, which connects the output of the hydraulic accumulator to the input of the jet nozzle 62. In addition, another change from FIG. 1 is that shaft 22 in this embodiment is solid, and hydraulic fluid flows around the shaft 22 within, casing 37. In this respect, valve 46 is an iris valve, which closes around shaft 22 to seal the oil flow from within casing 37 from entering the gear box casing.

In operation, when the vehicle is idle or stopped at a traffic light, for example, or even early in the morning when drivers warm their engines up, the valve 46 will shut the oil flow into compartment 24, meaning less wear on brakes. Then valve 49 opens and the oil pressure that is created by the continuous revolution of propeller 18 will escape from there and into the hydraulic accumulator 60. This hydraulic accumulator 60 can be gas (usually Nitrogen) or spring activated. If it is gas activated, then a heat exchanger can also be added to the piping to compress the gas by heating the gas as well to build up additional pressure in the accumulator.

When the vehicle driver wants to move the vehicle, valve 51 at the output of the accumulator 60 opens, and the accumulated pressurized hydraulic oil jets out of the jet nozzle 62 pointing at the impeller 17 at a certain angle to cause rotation of impeller 17. This aids impeller 17 rotation with minimal effort on the engine, hence saving fuel just by conserving the oil energy that could have been otherwise lost. That is, the accumulated oil pressure is used to help overcome the rotational inertia of the impeller, and help in rotation of shaft 22, without requiring additional engine power.

As a further modification, while the vehicle is idling a further pressure release valve may 340 be added to the accumulator 60, to act as pressure protection. If this valve (Pressure Relief Valve) opens to release excess pressure in the accumulator the resultant surge pressure can be transferred into a hydraulic oil reservoir that is also connected to return pipe 44. As such, no unused hydraulic pressure is wasted.

The invention claimed is:

1. A transmission comprising a driven shaft having one or more driven gears suitable for driving a driving shaft having a plurality of driving gears, wherein one or more of the driven gears are arranged to engage with one or more of the driving gears to thereby alter a speed or torque of the driving shaft relative to a speed or torque of the driven shaft, wherein the driven shaft is brought into engagement with one or more of the driven gears through the action of a pressurised fluid, and wherein the pressure of the pressurised fluid determines which of the one or more driven gears is engaged with the driven shaft, and wherein each driven gear comprises a corresponding annulus, the plurality of annuli being arranged concentrically, and wherein adjacent annuli are brought into engagement with one another through an increase in the pressure of the pressurised fluid and are brought out of engagement with one another through a reduction in the pressure of the pressurised fluid.

2. The transmission of claim 1, wherein each of the annuli arranged within another annulus comprises circumferential engaging means, the circumferential engaging means being adapted to engage with an outer annulus when the pressure of the pressurised fluid exceeds a corresponding predefined amount.

3. The transmission of claim 2, wherein the circumferential engaging means acts to allow egress of the pressurised fluid between adjacent annuli.

4. The transmission of claim 2, further comprising a sequence of adjacent annuli, each inner annulus having a corresponding set of circumferential engaging means for engaging with a respective adjacent outer annulus.

5. The transmission of claim 1, wherein a pressure of the pressurised fluid is varied through the action of a propeller and/or an impeller acting on the pressurised fluid.

6. The transmission of claim 5, wherein the pressure of the pressurised fluid may be altered by altering a speed of the propeller or impeller and/or an angle of attack of one or more blades of the propeller or impeller.

7. The transmission of claim 6, further comprising a swash plate to alter an angle of attack of one or more blades of the propeller or impeller.

8. The transmission of claims 5, wherein the propeller or impeller is housed in a Venturi cone and wherein the Venturi cone acts to funnel the pressurised fluid through a shaft.

9. The transmission of claim 8, wherein an impeller is directly connected to a shaft is also connected to the plurality of driving gears.

10. A method of gearing in a transmission, the transmission comprising a driven shaft having one or more driven gears suitable for driving a driving shaft having a plurality of driving gears, wherein one or more of the driven gears are arranged to engage with one or more of the driving gears to thereby alter a speed or torque of the driving shaft relative to a speed or torque of the driven shaft, the method comprising:
bringing the driven shaft into engagement with one or more of the driven gears through the action of a pressurised fluid, wherein the pressure of the pressurised fluid determines which of the one or more driven gears is engaged with the driven shaft, and wherein each driven gear comprises a corresponding annulus, the plurality of annuli being arranged concentrically; and
bringing adjacent annuli into engagement with one another through an increase in the pressure of the pressurised fluid and bringing the adjacent annuli out of engagement with one another through a reduction in the pressure of the pressurised fluid.

11. The method of claim 10, wherein each of the annuli arranged within another annulus comprises circumferential engaging means, the method further comprising engaging the circumferential engaging means with an outer annulus through the action of an increase in the pressure of the pressurised fluid by a predetermined amount.

12. The method of claim 11, further comprising allowing an egress of the pressurised fluid between adjacent annuli.

13. The method claim 11, wherein the transmission comprises a sequence of adjacent annuli, each inner annulus having a corresponding set of circumferential engaging means for engaging with the respective adjacent outer annulus.

14. The method of claim 10, further comprising varying the pressure of the pressurised fluid through the action of a propeller or an impeller acting on the pressurised fluid.

15. The method of claim 14, further comprising altering the pressure of the pressurised fluid by altering a speed of the propeller or impeller and/or an angle of attack of the propeller or impeller blades.

16. The method of claim 15, wherein the transmission further comprises a swash plate, the method further comprising altering the angle of the propeller blades through the action of the swash plate.

17. The method of claim 14, wherein the propeller is housed in a Venturi cone, the method further comprising funnelling the pressurised fluid through the Venturi cone to a shaft using an impeller or a propeller.

18. The method of claim 17, wherein the shaft is connectable to the plurality of driving gears.

\* \* \* \* \*